United States Patent
Shedletsky

(10) Patent No.: US 9,891,098 B2
(45) Date of Patent: Feb. 13, 2018

(54) DIFFUSER AND FILTER STRUCTURES FOR LIGHT SENSORS

(75) Inventor: Anna-Katrina Shedletsky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1827 days.

(21) Appl. No.: 12/982,637

(22) Filed: Dec. 30, 2010

(65) Prior Publication Data

US 2012/0170284 A1  Jul. 5, 2012

(51) Int. Cl.
*G01J 1/04* (2006.01)
*G02F 1/133* (2006.01)
*G09G 3/34* (2006.01)

(52) U.S. Cl.
CPC .......... *G01J 1/0407* (2013.01); *G01J 1/0474* (2013.01); *G02F 1/13318* (2013.01); *G09G 3/3406* (2013.01); *G09G 2320/0626* (2013.01); *G09G 2360/144* (2013.01)

(58) Field of Classification Search
CPC .......... G01J 3/51; G01J 5/0831; G01J 5/0878; G01J 5/0881; G01J 5/0884; G01J 1/0474; G01J 1/0407; H01L 27/14625; H01L 27/14621; H01L 27/14623; H01L 27/14627; H01L 27/1464; H01L 27/3281
USPC ..... 250/208.1, 216, 226, 574, 237 G, 237 R, 250/239, 214.1; 345/169, 175–176; 359/308–310, 502, 588, 590, 608, 609, 359/707–712, 722–723; 257/431–435
See application file for complete search history.

(56) References Cited

U.S. PATENT DOCUMENTS

| | | | | |
|---|---|---|---|---|
| 3,162,766 A * | 12/1964 | Ploke | ........................ | G01J 1/04 136/246 |
| 3,981,590 A * | 9/1976 | Perkins | ........................ | 356/407 |
| 4,411,521 A * | 10/1983 | Jourdan | .................... | G01J 1/04 250/216 |
| 4,539,482 A * | 9/1985 | Nose | ........................ | 250/208.1 |
| 5,051,872 A * | 9/1991 | Anderson | ................ | F21S 8/00 362/268 |
| 5,682,215 A * | 10/1997 | Nishihara et al. | ............. | 349/95 |
| 6,046,462 A * | 4/2000 | Yokajty et al. | ......... | 250/559.08 |
| 6,822,707 B2 * | 11/2004 | Ariyoshi et al. | ............. | 349/112 |
| 6,992,828 B2 * | 1/2006 | He | ....................... | G02B 5/0221 359/599 |
| 7,515,143 B2 * | 4/2009 | Keam et al. | .................. | 345/175 |
| 8,094,129 B2 * | 1/2012 | Izadi et al. | .................... | 345/173 |

(Continued)

*Primary Examiner* — Georgia Y Epps
*Assistant Examiner* — Don Williams
(74) *Attorney, Agent, or Firm* — Treyz Law Group, P.C.; G. Victor Treyz; Zachary D. Hadd

(57) ABSTRACT

An electronic device may have a display. The display may have a central active area and a peripheral inactive area. A cover layer such as a layer of cover glass may be used to cover the display. The inner surface of the cover layer in the inactive area may be coated with an opaque masking layer such as black ink. Light for an ambient light sensor or other component may pass through an opening in the black ink. A layer of ink or other structures may be mounted within the opening to serve as a filter structure. A light diffusing structure such as a clear member with a textured surface may be used to diffuse light that is passing through the opening in the black ink and the filter to the light sensor. Integral filter-diffuser structures and structures with concave surfaces for focusing incoming light onto the light sensor may be used.

15 Claims, 15 Drawing Sheets

(56) References Cited

U.S. PATENT DOCUMENTS

| | | | |
|---|---|---|---|
| 8,530,115 B2* | 9/2013 | Rho ................................. | 430/7 |
| 2002/0149546 A1* | 10/2002 | Ben-Chorin ........... | G09G 3/002 |
| | | | 345/32 |
| 2005/0057130 A1* | 3/2005 | Ushiyama et al. ........... | 313/110 |
| 2005/0253923 A1* | 11/2005 | Komori ............... | H04M 1/0264 |
| | | | 348/14.02 |
| 2005/0285021 A1* | 12/2005 | Chiu ..................... | G06F 3/0317 |
| | | | 250/216 |
| 2008/0303180 A1* | 12/2008 | Lee et al. ..................... | 264/1.27 |
| 2009/0284507 A1 | 11/2009 | Ito et al. | |
| 2010/0273530 A1 | 10/2010 | Jarvis et al. | |
| 2010/0309369 A1* | 12/2010 | Jarvis .................. | H04N 5/2254 |
| | | | 348/371 |

* cited by examiner

DIFFUSER AND FILTER STRUCTURES FOR LIGHT SENSORS

BACKGROUND

This relates generally to electronic devices, and more particularly, to light sensor structures for electronic devices.

Electronic devices are often provided with light sensors. For example, an electronic device may be provided with an ambient light sensor. An electronic device may use its ambient light sensor to make adjustments to the brightness of a display in real time. If, for example, an electronic device is operated in a bright environment, the brightness of a display in the device may be maximized to allow a user to easily view content on the display. If the electronic device is operated in a dim environment, the brightness level for the display may be set to a lower level to avoid overwhelming the user with an overly bright display.

Proper display brightness adjustments rely on accurate ambient light measurements with the ambient light sensor. In a typical light measurement scenario, an electronic device may take an ambient light reading with an ambient light sensor when the device is powered up. If a user happens to be holding the device so that the ambient light sensor is pointed at a bright light source during the power up process, there is a potential for the ambient light sensor to detect an erroneously large amount of ambient light. This can cause the electronic device to set the brightness level of the display at an undesirably high level. Conventional light sensors may also be challenging to fabricate with desired tolerances, particularly in high volume manufacturing scenarios.

It would therefore be desirable to be able to provide improved arrangements for light sensors in electronic devices.

SUMMARY

An electronic device may be provided with a display. The display may be mounted in a device housing. The display may have an active central portion that displays images and an inactive peripheral region.

A cover layer may be formed on the display. The cover layer may be formed form a planar transparent member such as a rectangular layer of glass. A layer of opaque masking material such as a layer of black ink may be formed on the inner surface of the cover layer in the inactive region of the display.

An opening may be formed in the opaque masking layer to accommodate a light sensor or other optical component. The light sensor may be, for example, an ambient light sensor that makes measurements of ambient lighting conditions during use of the electronic device.

The opening in the opaque masking layer may be covered with filter structures and light diffusing structures. A layer of ink or a solid material may be used in forming a filter. Filtering may also be provided by structures associated with a light sensor, by adhesive with filtering properties, by light diffusing structures, by other optical structures, or by combinations of these structures.

Light diffusing structures may be formed from a material that scatters light. For example, a diffuser may be implemented using a transparent structure with a textured surface that scatters light. The light diffusing structures may diffuse light that is being received by the light sensor thereby reducing the directionality of the light sensor.

Integral filter-diffuser structures may be formed by combining filtering and light diffusing structures into a common unit. A curved surface may be used on a filter, diffuser, or on an integral filter-diffuser to help concentrate incoming light onto the light sensor.

Further features of the invention, its nature and various advantages will be more apparent from the accompanying drawings and the following detailed description of the preferred embodiments.

DETAILED DESCRIPTION

Electronic devices may be provided with light sensors. For example, light sensors may be incorporated into electronic devices with displays so that the brightness of the display can be adjusted automatically based on ambient lighting conditions. Light sensors may also be used as part of a proximity sensor, as part of a light meter for a camera, as part of a user input interface device, as part of a light-based communications port, or in other light-sensing applications.

Figure 1:
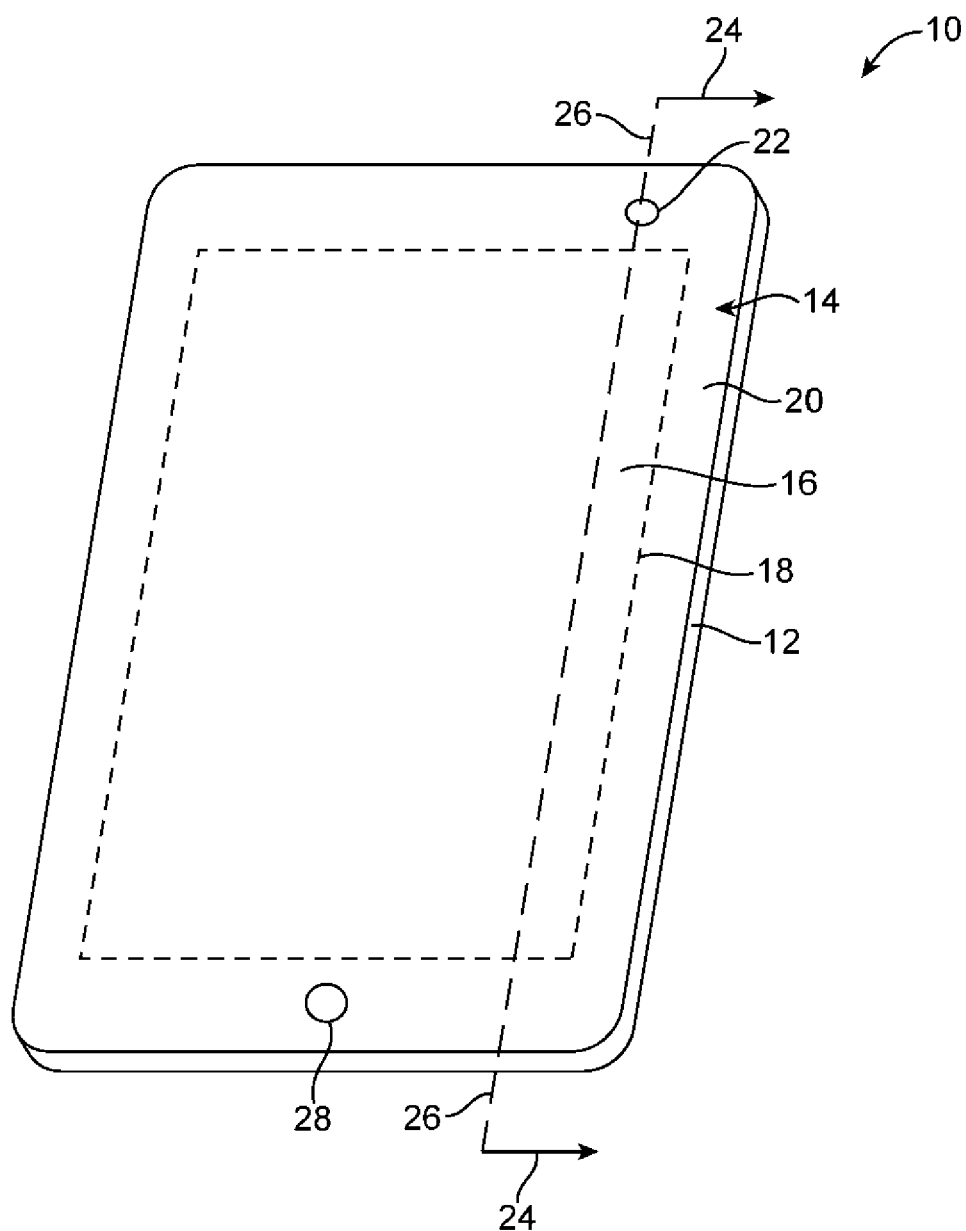
FIG. 1 is a perspective view of an illustrative electronic device with light sensor structures in accordance with an embodiment of the present invention.

An illustrative electronic device of the type that may include a light sensor is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, other handheld devices, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch sensor electrodes. Display 14 may include image pixels formed form light-emitting diodes (LEDs), organic LEDs (OLEDs), plasma cells, electronic ink elements, liquid crystal display (LCD) components, or other suitable image pixel structures. A cover layer may cover the surface of display 14. The cover layer may be formed from a transparent planar member such as a layer of glass (sometimes referred to as cover glass) or a layer of clear plastic.

In a rectangular ring-shaped peripheral region such as peripheral region 20 of display 14, the underside of the cover layer may be coated with an opaque masking layer such as black ink. Peripheral region 20 may surround central rectangular region 16. Rectangular dashed line 18 of FIG. 1 shows the boundary between central region 16 and peripheral region 20 in the example of FIG. 1.

Central region 16 may sometimes be referred to as the active region of display 14. Peripheral region 20 may sometimes be referred to as the inactive region of the display. During operation, an array of image pixels in display 14 can produce images within active region 16. The black ink or other masking layer that is formed under inactive peripheral region 20 may be used to hide internal device structures from view from the exterior of device 10.

The cover layer of display 14 may include openings such as a circular opening for button 28, openings for speaker ports, openings for other buttons, openings for connectors, etc.

The black ink or other opaque masking layer material that is formed on the underside of the cover layer may have openings that coincide with the openings in the cover layer. Additional openings in the black ink or other opaque masking layer material may be formed to allow light to pass through the cover layer. For example, an opening such as black ink layer opening 22 of FIG. 1 may be formed to allow light to pass from the exterior of device 10 to an internal light sensor. Openings of this type may also be formed in the opaque masking layer to create windows that allow internal light (e.g., light from an infrared light-emitting diode in a proximity sensor or other light source) to pass from the interior of device 10 to the exterior of device 10.

Figure 2:
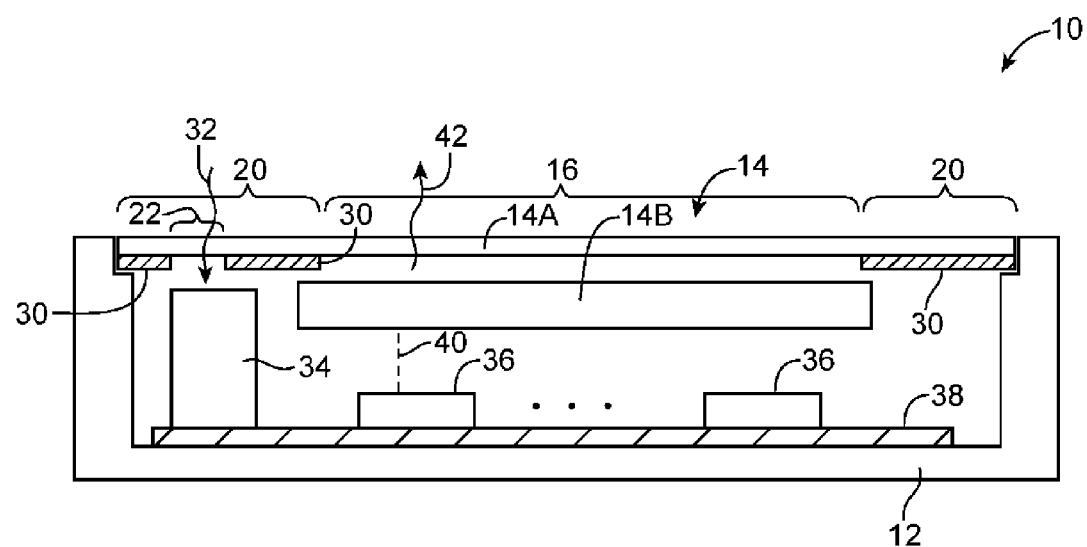
FIG. 2 is a cross-sectional view of an electronic device of the type shown in FIG. 1 showing how a light sensor may receive light through a planar transparent member such as a layer of glass or other clear material associated with a display in accordance with an embodiment of the present invention.

A cross-sectional side view of device 10 of FIG. 1 taken along line 26-26 of FIG. 1 and viewed in direction 24 is shown in FIG. 2. As shown in FIG. 2, display 14 of device 10 may have a display module such as display module 14B and a planar cover layer member such as cover layer 14A.

Display module 14B may be, for example, a backlit liquid crystal display (LCD), organic light-emitting diode (OLED) display, plasma display, backlit electronic ink display, or other display with an adjustable brightness. Control circuitry in electronic components 36 may be linked to display module 14B by communications path 40. During operation, the control circuitry may be used to adjust the brightness of display module 14B and therefore the brightness of display 14. Brightness adjustments may be made automatically or in response to user input. In making automatic brightness adjustments, the control circuitry may use measured ambient light data that is gathered using a light sensor such as ambient light sensor 34. Ambient light measurements may be made using visible light, infrared light, a combination of visible and infrared light, or other suitable ambient light. With one suitable arrangement, which may sometimes be described herein as an example, the optical components in device 10 such as filter structures, adhesive, diffuser structures, and sensor-based filters, may be used to tailor the overall optical response of the ambient light sensor to mimic that of the human eye (e.g., the light sensor stack-up may exhibit a maximum sensitivity at about 555 nm, as with the human eye or may at least be configured to be sensitive at visible wavelengths). An ambient light sensor arrangement of this type may be referred to as exhibiting a photopic response (i.e., a response that mimics the responsivity of the human eye). Ambient light sensor arrangements that exhibit non-photopic responses may also be used in device 10 if desired.

Electronic components 36 may include integrated circuits, connectors, switches, batteries, discrete components such as resistors, inductors, and capacitors, sensors, input-output devices, memory, processor circuitry, and other electronic devices. Electronic components 36 and sensor 34 may be interconnected using conductive lines in printed circuit boards, traces on flexible cables such as flex circuit cables, coaxial cables, wires, and other electrical communications paths. In the example of FIG. 2, light sensor 34 and components 36 have been mounted on substrate 38. Substrate 38 may be formed from a rigid printed circuit board (e.g., a printed circuit board formed form fiberglass-filled epoxy), a flexible printed circuit board (e.g., a flex circuit formed from a thin layer of flexible polymer such as a sheet of polyimide), a rigid flex (e.g., a substrate with a rigid printed circuit board portion and flex circuit tails), more than one printed circuit board structure, substrates formed from molded plastic, ceramic, or glass, or other suitable substrate structures.

Cover layer 14A of FIG. 2 is formed from a material that is transparent to visible light. This allows light 42 from display module 14B to be viewed by a user of device 10. Examples of suitable materials that may be used for cover layer 14A include glass, ceramic, polymers, laminated stacks of glass, ceramic, polymer, or other clear materials, or combinations of these materials. If desired, cover layer 14A may be formed from part of display module 14B. For example, cover layer 14A may serve as a color filter layer, polarizer layer, touch sensor substrate layer, antireflection layer, or other layer in display module 14B as well as serving as a protective outer layer for display 14.

To hide internal portions of device 10 from view from the exterior of device 10, inactive portions of display 14 may be provided with an opaque masking structure. In the illustrative configuration of FIG. 2, an opaque masking structure has been formed using a layer of opaque material such as black ink on the inner surface of cover layer 14A in inactive display region 20. As shown in FIG. 2, black ink 30 may be provided with an opening such as opening 22 to allow light 32 to pass between the exterior of device 10 and the interior of device 10. Opening 22 may form a light sensor window in layer 30 that allows light 32 to pass to sensor 34. In configurations in which device 10 has internal components that generate light, windows such as opening 22 may be formed to allow light to pass through cover layer 14A from the interior to the exterior of device 10.

Opening 22 in ink layer 30 may be free of any additional materials (i.e., cover layer 14A may be bare within opening 22). If desired, a layer of ink or other structures may be formed on the underside of cover layer 14A within opening 22. As an example, a layer of infrared (IR) ink may be placed within opening 22 to serve as a visible-light-blocking and infrared-light-transmitting filter. Filter structures of this type may help block the interior of device 10 from view by a user, because the user's eyes are only sensitive to visible light. At the same time, the infrared-light-transmitting qualities of the IR ink may allow ambient light 32 (e.g., light in the near infrared spectrum) to reach light sensor 34. Filter structures may also be associated with light sensor 34. For example, an IR-cut filter may be included in the packaging for sensor 34 or may be otherwise interposed within the incoming light path for sensor 34. Adhesive layers, diffuser structures, lens structures and other optical structures may also be provided with filtering capabilities (e.g., by using stacked dielectric layers with appropriate indicies of refraction, by incorporating dyes or other filter materials into appropriate optical structures, etc.). The net spectral response of the light sensor and associated optical structures in the incoming light path for the sensor may, if desired, be tailored to mimic the response of the human eye or may be used to implement other desired spectral response curves.

Figure 3:
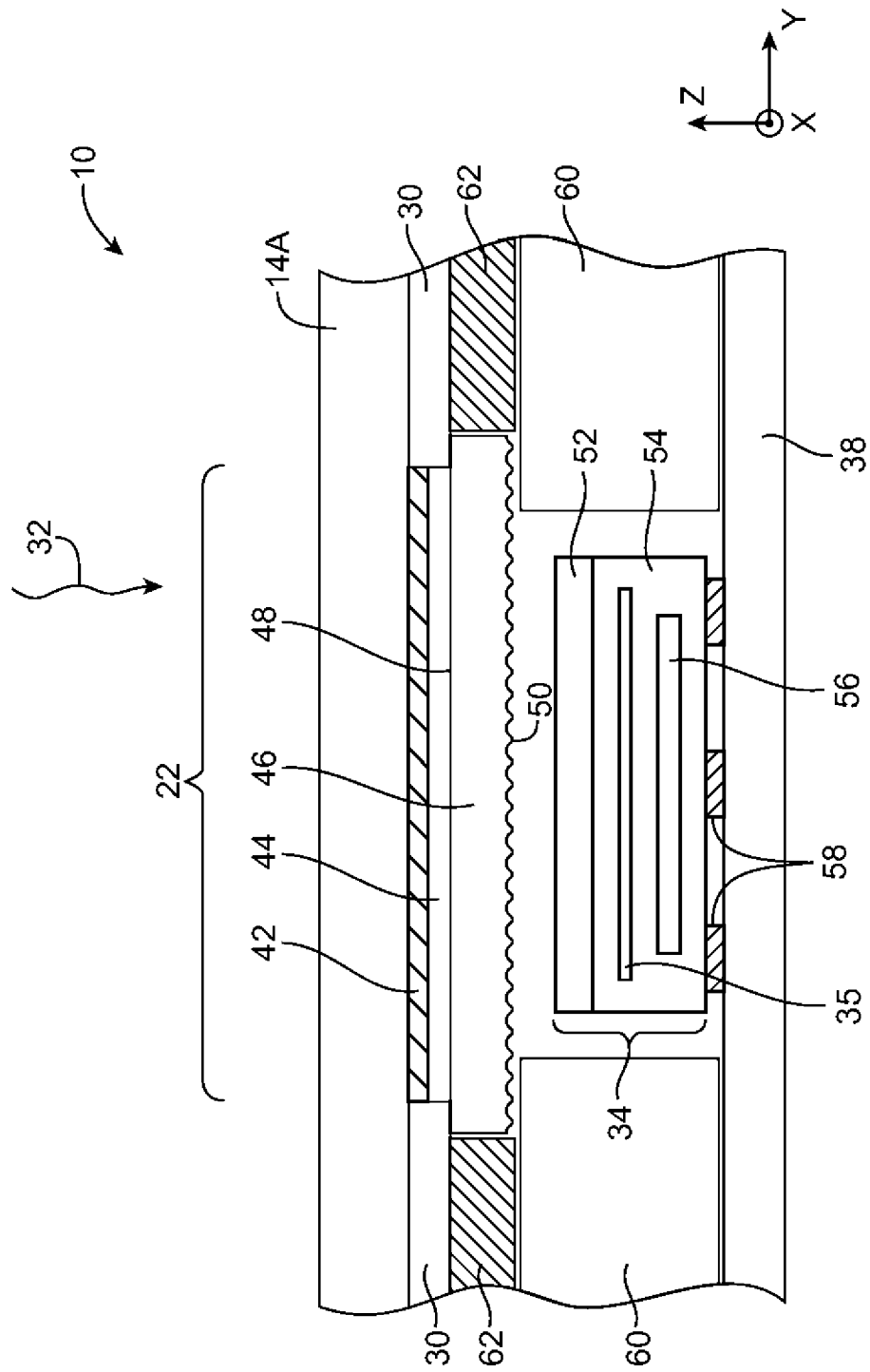
FIG. 3 is a cross-sectional view of display structures that include an ink layer that serves as a light filter layer and that include a diffuser in accordance with an embodiment of the present invention.

FIG. 3 is a cross-sectional side view of a portion of an illustrative device in which a light filter has been formed in opening 22 using a layer of light filtering ink. As shown in FIG. 3, device 10 may have a cover layer such as cover layer 14A on which opaque masking layer 30 has been formed. Opaque masking layer 30 may be, for example, black ink or other material that is opaque in the visible portion of the spectrum. Filter layer 42 may be formed from a layer of ink or other material with a desired spectral characteristic. As an example, layer 42 may be formed from a layer of ink that blocks visible light and that is transparent to infrared light (i.e., IR ink). This type of arrangement allows infrared light 32 to pass through opening 22 to sensor 34 without allowing a user to view internal device components such as sensor 34 from the exterior of device 10. Sensor 34 may have associated filters such as illustrative internal filter 35. The spectral response of semiconductor sensor 56 (which may, for example, be more sensitive in the infrared than the visible) may be adjusted using filter structures such as internal filter 35, filter layer 42, and filtering structures that are integrated into one or more other optical component in the light path leading to sensor 34 (e.g., filtering structures integrated into a diffuser, filtering structures integrated into adhesive, filtering structures integrated into other optical components, etc.).

Display cover layer 14A may be attached to internal device structures (e.g., a frame, mounting structures, support structures, and other internal components). For example, cover layer 14A may be attached to metal bracket 62. Metal bracket 62 may have an opening that is approximately the same size as opening 22 in black ink layer 30. Diffuser 46 may be mounted in the opening in bracket 62 over opening 22 in black ink layer 30.

Sensor 34 may have a glass cover such as cover 52. Cover 52 may be mounted on sensor package 54. Semiconductor light sensor 56 (e.g., a photodiode or other light sensor component) may be mounted within package 54. Internal filter 35, cover 52, or other structures associated with sensor 34 may serve as light filters that adjust the spectral response of the ambient light sensor for device 10. For example, internal filter 35 may be an infrared cut filter that helps reduce excessive sensitivity of semiconductor sensor 56 in the infrared, thereby enhancing the visible response of sensor 34 relative to the infrared response of sensor 34.

Package 54 may be, for example, a surface mount technology (SMT) component that is mounted to printed circuit board 38 or other suitable substrate. In the illustrative configuration shown in FIG. 3, light sensor package 54 has been mounted to substrate 38 using solder 58. If desired, conductive adhesive, fasteners, or other attachment mechanisms may be used in electrically and mechanically attaching light sensor 34 to substrate 38.

In a typical configuration, sensor 34 may be separated from layer 42 by about 1 mm. The height of sensor 34 may be about 0.6 mm. The lateral dimensions of sensor 34 (i.e., the dimensions of sensor 34 in dimensions X and Y of FIG. 3) may be about 0.9 mm and 1.6 mm. The thickness of glass 52 may be about 0.4 mm. The lateral dimensions of opening 22 may be about 2 mm. Bracket 62 and diffuser 46 may be about 0.3 mm thick. Diffuser 46 may have lateral dimensions of about 2.6 mm (matching the lateral dimensions of the corresponding opening in bracket 62).

Diffuser 46 may help reduce the directionality of sensor 34. In some operating environments, light hotspots may pose challenges that make it difficult to obtain accurate ambient light readings. Consider, as an example, a scenario in which an electronic device makes an ambient light reading upon power up and makes corresponding display brightness adjustments without taking further ambient light readings. In this type of scenario, use of an ambient light sensor that is too directionally specific, may sometimes cause the ambient light reading to be too high or too low. If, as an example, a user powers up a device when the ambient light sensor is pointed at an unusually bright region in the user's environment such as a spotlight, the device may erroneously conclude that the user's environment is bright. On the other hand, if the user powers of the device when the ambient light sensor is pointed at a particularly dark area, the device may erroneously conclude that the user's environment is dark. The user of ambient light sensor arrangements that are overly directional may therefore cause an electronic device to take inappropriate actions, such as making inaccurate display brightness adjustments.

To reduce that directional specificity of light sensor 34 of FIG. 3, device 10 of FIG. 3 has been provided with diffuser 46. Diffuser 46 may diffuse incoming light 32, so that ambient light readings taken with ambient light sensor 34 are not overly sensitive to the orientation of sensor 34 and device 10.

Diffuser 46 may be formed from polymer, glass, ceramic, other materials, or combinations of these materials. In some configurations, diffuser 46 and filter 42 may be formed as a unitary structure. In other configurations, diffuser 46 and filter 42 may be formed as separate parts. Layers of adhesive may, if desired, be used in connecting light sensor structures such as a filter and/or diffuser structure. In the arrangement of FIG. 3, for example, diffuser 46 may be attached to ink layer 42 using adhesive 44. Adhesive 44 may be formed, for example, from an optically clear adhesive (OCA). Adhesives such as adhesive 44 and the other adhesives used in device 10 may, in general, be formed from liquids (e.g., thermally cured or ultraviolet-light-cured epoxy or other liquid adhesives), pressure sensitive adhesive (PSA), adhesive on tape, or other suitable adhesive materials. Light filter materials (e.g., dyes that absorb light at particular wavelengths) may, if desired, be incorporated into adhesive 44 and other adhesives in the light path for sensor 34 to adjust the spectral response of sensor 34 (i.e., one or more layers of adhesive may be used in implementing spectral filter structures). Adhesive 44 and other layers of adhesive in the light path for sensor 34 may also be provided with diffusing capabilities (i.e., adhesive may be formed using translucent materials that help to scatter light).

Diffuser 46 may be formed from a material that incorporates internal light-scattering structures and/or from a structure that includes one or more surfaces that assist in light scattering. Examples of internal structures that may help scatter light include bubbles (e.g., air bubbles, voids filled with other gases, voids filled with vacuum, particles such as spheres or other pieces of polymer, glass, or ceramic that have an index or refraction that is different than the primary structural material from which diffuser 46 is formed, dye structures, pigment-based structures, etc. These approaches may be used to provide a stand-alone diffuser element with diffusing properties and/or may be used in providing other optical material in the incoming light path for sensor 34 (e.g., adhesive, window material, lens structures, filters, etc.) with diffusing properties. As shown in the example of FIG. 3, diffuser 46 may have one a flat surface such as flat upper surface 48 and a textured surface such as surface 50. The flat upper surface of diffuser 46 in FIG. 3 may help in forming a smooth optical interface that receives incoming light 32 without undue reflection. Textured lower surface 50 may help scatter light 32 as light 32 exits diffuser 46 towards the interior of device 10.

Any suitable type of texture may be used in forming lower surface 50. For example, surface 50 may include multiple ridges (e.g., to form a corrugated surface pattern), may include bumps, may include other types of surface texture patterns, and may include combinations of these patterns. In configurations in which the light diffusing properties of diffuser 46 are based at least partly on the texture present on textured surface 50, it may be desirable to ensure that textured surface 50 is not covered with adhesive. Diffuser 46 may, for example, be mounted to filter layer 42 using adhesive 44, so that only smooth upper surface 48 of diffuser 46 is exposed to the adhesive and not textured lower surface 50. If adhesive is placed in contact with textured surface 50, the adhesive may tend to serve as an index-of-refraction-matching material that tends to reduce scattering and therefore reduces the light diffusing properties of diffuser 46.

Figure 4A:
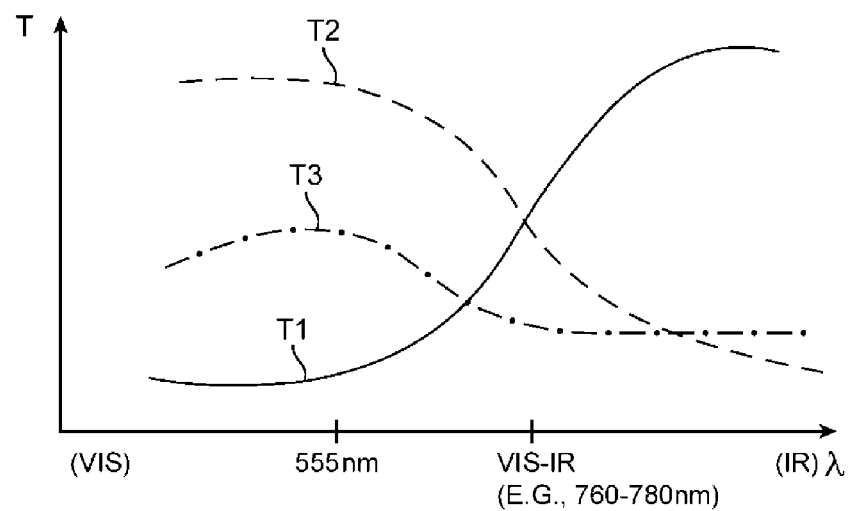
FIG. 4A is a graph showing how the light transmittance of optical structures may vary as a function of wavelength in accordance with an embodiment of the present invention.

FIG. 4A is a graph showing how optical structures in the light path for sensor 34 such as filter structures and other structure may have various spectral characteristics. In the graph of FIG. 4A, the transmittance T of three illustrative filters has been plotted as a function of wavelength λ. In the visible light portion of the spectrum (VIS), the filter associated with illustrative transmittance curve T1 transmits relatively small amounts of light (i.e., the filter is essentially opaque to visible light). In the infrared portion of the spectrum (IR), the value of transmittance T1 is high (i.e., this filter is transparent at infrared wavelengths). The boundary between the visible and infrared portions of the light spectrum is at about 760 to 780 nm and is denoted by the label VIS-IR on the wavelength axis of the graph of FIG. 4A. Transmittance curve T2 corresponds to illustrative filter structures that pass visible light and that block infrared light. Transmittance curve T3 corresponds to an illustrative filter structures that cut both visible and infrared light and that allows somewhat more visible light to pass at a wavelength of about 555 nm (e.g., to help implement a photopic response for the ambient light sensor).

Any one, two, three, or more than three of the optical structures in the incoming light path for sensor 34 and/or the semiconductor sensor within sensor 34 (e.g., sensor element 56 of FIG. 3) may be implemented using structures and materials that tailor their spectral response curves to provide a desired overall response for the ambient light sensor. Examples of structures within device 10 that can be configured to provide desired transmittances as a function of wavelength so as to adjust the overall response of the ambient light sensor include: cover glass layers or other display layers that form windows for receiving incoming light, adhesive layers that hold components together such as adhesive 44 of FIG. 3, diffuser structures such as structure 46 of FIG. 3, filter layers such as filtering ink layer 42, filter structures such as filter structure 35, sensor cover structures such as sensor cover layer 52, additional filter elements (e.g., lens shaped or planar filters), other filter structures, and combinations of these structures.

Figure 4B:
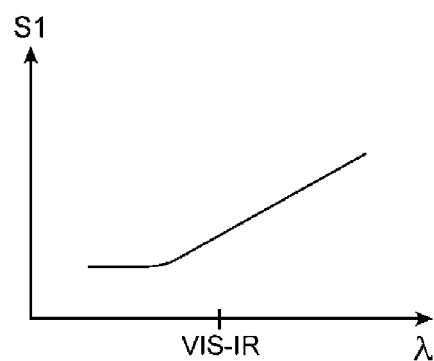
FIG. 4B is a graph of an illustrative sensor sensitivity characteristic in accordance with an embodiment of the present invention.

FIG. 4B shows how semiconductor sensor 56 in sensor 34 may be more sensitive at infrared wavelengths than at visible wavelengths (as an example). In FIG. 4B, the sensitivity S1 of sensor 56 has been plotted as a function of wavelength λ.

Figure 4C:
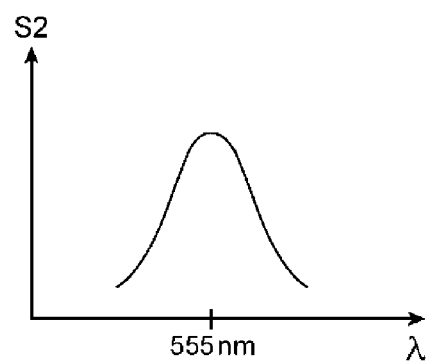
FIG. 4C is a graph of an illustrative photopic light sensor characteristic of the type that may be produced by incorporation of filter structures, diffuser structures, adhesive structures, and sensor structures with appropriate spectral characteristics in accordance with an embodiment of the present invention.

FIG. 4C shows how the net spectral response of all of the structures interposed between the exterior of device 10 and sensor 56 may, in combination with the inherent spectral response of sensor 56, produce a photopic response curve. As shown in FIG. 4C, the overall spectral response of the sensor structures in device 10 may be tailored to mimic that of the human eye (e.g., so that overall sensitivity S2 peaks at a wavelength of about 555 nm or other visible wavelength) or may at least be adjusted so that the sensor is responsive to changes in ambient light within the visible part of the spectrum. One way that a photopic response may be obtained is by forming layer 42 of FIG. 3 from an ink that blocks all but 2% of incoming visible light (e.g., to block sensor 34 from view from the exterior of device 10 and to help ensure that the sensor is not saturated during normal use), by using spectrally neutral diffuser and adhesive layers, and by providing sensor 34 with an IR cut filter (e.g., internally using filter 35 or externally in layer 42 or another structure) to help compensate for the inherent IR sensitivity of sensor 56 and to thereby ensure that the sensor does not become saturated. If desired, sensor responses of the type shown in FIG. 4C may be accommodated without using IR blocking filters such as filter 35 of FIG. 3 by ensuring that other structures with spectral filtering capabilities (e.g., filter layer 42, adhesive 44, diffuser 46, and/or other material in the optical stack) block IR light while allowing an appropriate amount of light at visible wavelengths to be sensed. For example, the response of FIG. 4C or other visible-light-sensitive response may be implemented by using only filter ink 42 and the inherent response of sensor 56 (as an example).

The shapes of the optical structure transmittance curves of FIG. 4A, the semiconductor sensor response curve of FIG. 4B, and the overall ambient light sensor sensitivity curve of FIG. 4C are examples. If desired, other filter transmittance curves may be associated with filter structures for device 10, the semiconductor sensor element associated with sensor 34, and the overall response for the ambient light sensor. For example, one or more optical structures in the light path for sensor 34 may have a bandpass characteristic (e.g., at a visible or infrared wavelength), may have a high-pass characteristic, may have a low-pass characteristic, may have a notch filter characteristic, may have steeper or more gradual shapes, may exhibit one or more peaks or valleys as a function of wavelength, or may have other non-flat spectral transmittance characteristics in the visible and IR portions of the light spectrum. The curves of FIGS. 4A, 4B, and 4C are merely illustrative.

Device 10 may include light sources such as light-emitting diodes in a backlight portion of display module 14B. To prevent stray light from display module light-emitting diodes or other internal sources, light sensor 34 may be surrounded by light-blocking structures 60, as shown in FIG. 3. Light-blocking structures 60 may be formed from black foam or other material that helps ensure that stray light from light-emitting diodes or other internal light sources does not reach light sensor 34.

Figure 5:
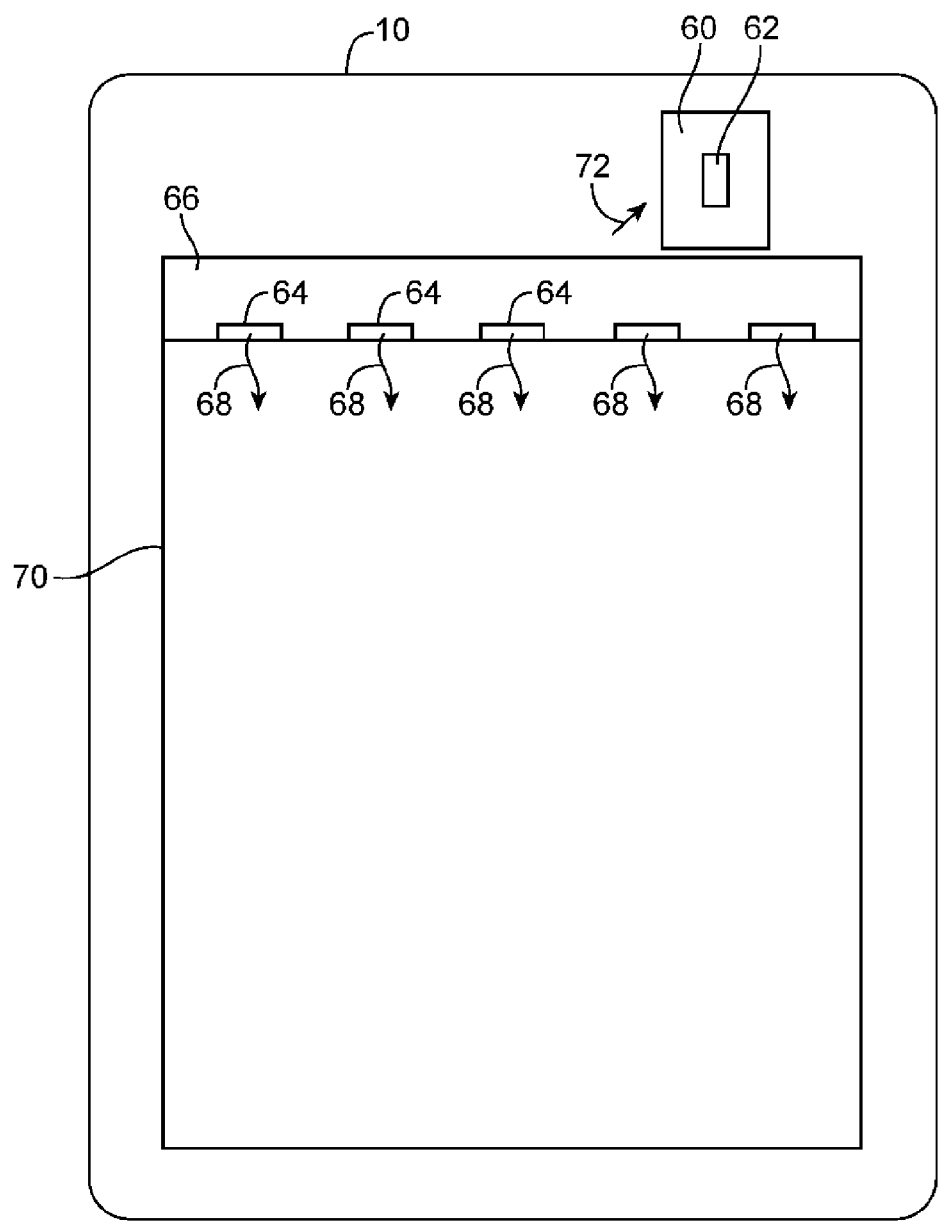
FIG. 5 is a top interior view of an electronic device with a light sensor in accordance with an embodiment of the present invention.

As shown in the top view of the interior of device 10 in FIG. 5, light-blocking structures 60 may have a rectangular central hole 62 into which light sensor 34 is placed. During operation of device 10, light-emitting diodes 64 that are mounted on flex circuit substrate 66 may launch light 68 into light guide plate 70 to serve as backlight for display 14. Light guide plate 70 may be used to horizontally distribute the backlight from light-emitting diodes 64 under the image pixel structures of display module 14B. Some of light 68 may leak in direction 72 towards sensor 34, but this leaked light will tend to be blocked by light-blocking structures 60.

Figure 6:
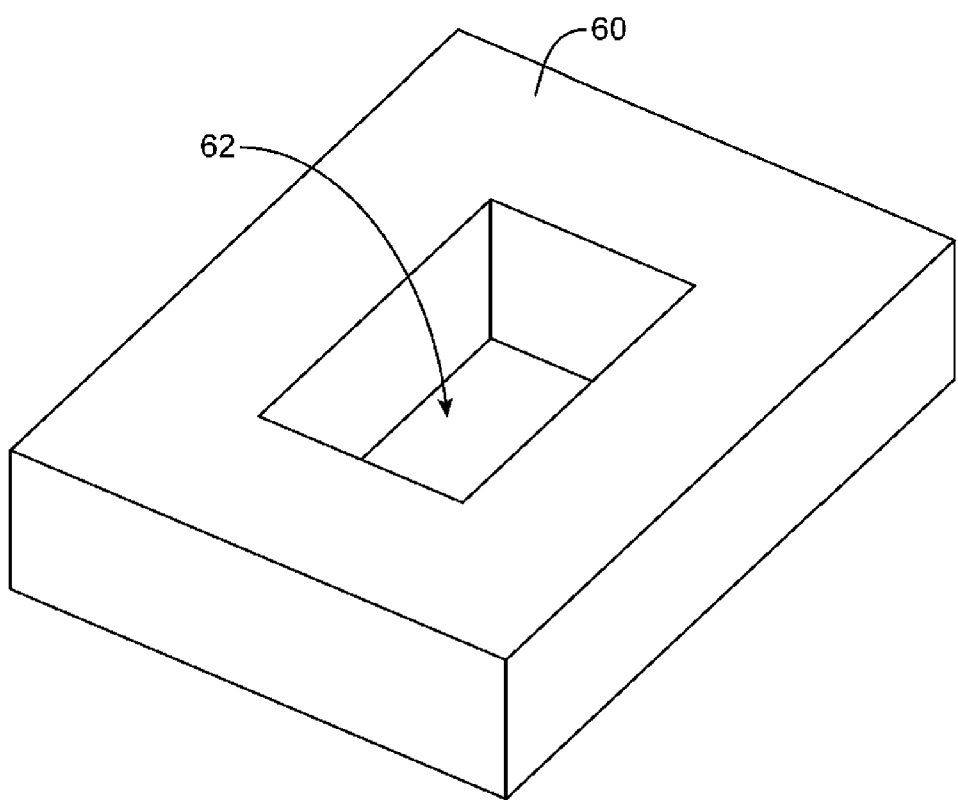
FIG. 6 is a perspective view of a light-blocking structure such as a black foam structure that may be used to prevent light leakage from adversely affecting light sensor operation in accordance with an embodiment of the present invention.

FIG. 6 shows an illustrative shape that may be used for light-blocking structures 60. Other shapes may be used if desired (e.g., circular shapes, shapes with curved and straight edges, shapes having openings 62 with curved and/or straight sides, etc.).

Figure 7:
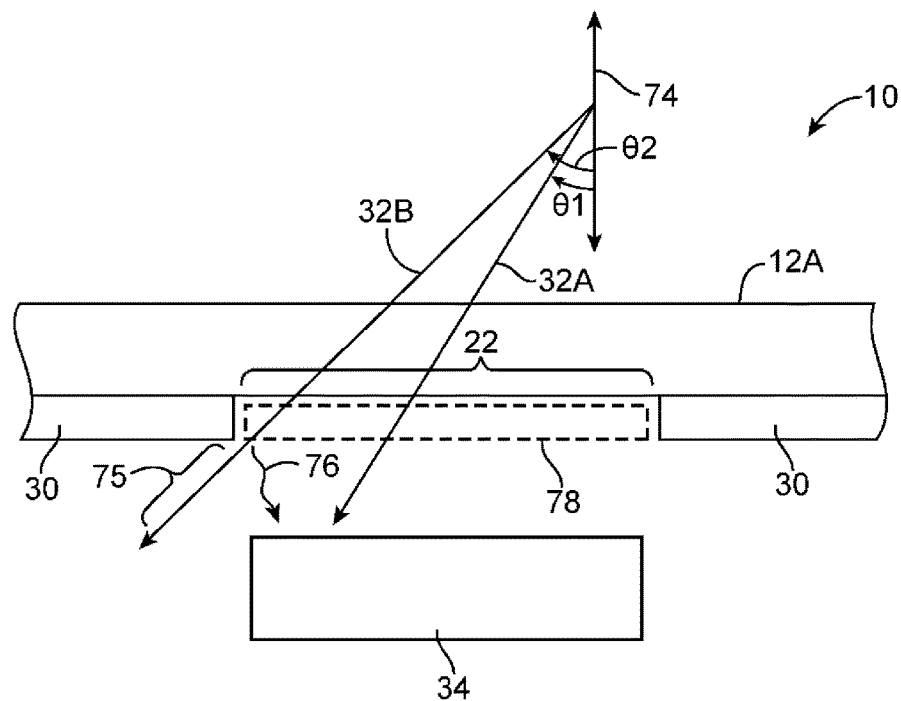
FIG. 7 is a diagram showing how the use of diffuser structures may enhance light sensor performance by reducing sensor directionality in accordance with an embodiment of the present invention.

The ability of light-diffusing structures such as diffuser 46 to decrease the directionality of the ambient light sensor or other optical component in device 10 may be understood with reference to FIG. 7. As shown in FIG. 7, incoming light rays that pass through opening 22 may take paths such as paths 32A and 32B. Light rays along paths such as path 32A may be oriented at angle θ1 with respect to vertical axis 74. Light rays following paths such path 32B may be oriented at angle θ2 with respect to vertical axis 74. In this example, angle θ1 is smaller than angle θ2. Light rays that are oriented at angles of θ1 or less with respect to vertical axis 74 will generally pass through opening 22 and will be detected by light sensor 34.

The behavior of light rays that are oriented at larger angles such as light rays following path 32B at angle θ2 with respect to vertical axis 74 depends on whether or not a diffusing structure is present in position 78 within opening 22. In situations in which no diffuser is present in position 78, light rays along path 32B will tend to miss light sensor 34 and will not be detected, as indicated by portion 75 of light ray path 32B. When a diffuser such as diffuser 46 of FIG. 3 is present in position 78, however, the diffuser may scatter the incoming light from path 32B towards sensor 34, as indicated by light ray 76 of FIG. 7.

The absence of a diffuser in opening 22 therefore tends to make sensor 34 more directional. The presence of a diffuser in opening 22 has the effect of scattering light and reducing sensor directionality. Sensor arrangements that are less directional may exhibit improved performance during operation, because less directional sensor schemes help avoid undesired responses of the type that might otherwise arise when device 10 and sensor 34 are pointed at localized sources of light (or locally dark regions). The use of diffusers may also ease alignment tolerance requirements during manufacturing, thereby improving manufacturing yields.

Figure 8:
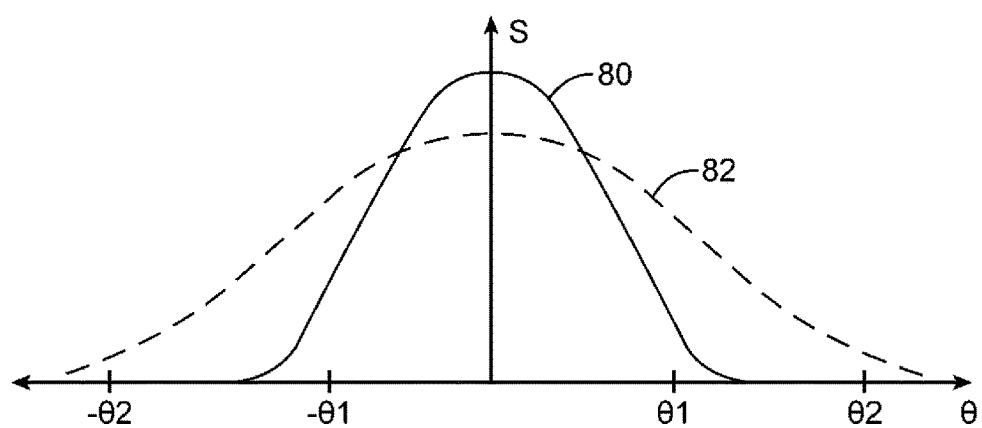
FIG. 8 is a graph showing how a light sensor may accept light rays from a greater range of acceptance angles when a diffuser is used than when a diffuser is not used in accordance with an embodiment of the present invention.

The graph of FIG. 8 illustrates how the presence of diffuser structures within opening 22 may decrease the directionality of the light sensor in device 10. In the graph of FIG. 8, sensor sensitivity S has been plotted as a function of the angle θ of incoming light. Curve 80 corresponds to the response of the light sensor structures of FIG. 7 in the absence of light diffusing structures in region 78. Curve 82 corresponds to the response of the light sensor structures of FIG. 7 in the presence of light diffusing structures in region 78. As the graph of FIG. 8 demonstrates, curve 80 has a narrower shape than curve 82. This indicates that sensor directionality is reduced as desired when including a diffuser in opening 22.

Figure 9:
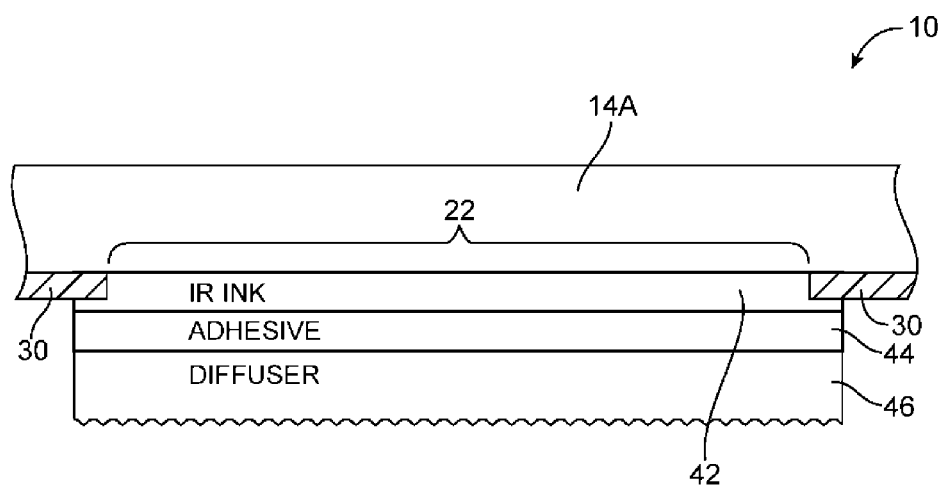
FIG. 9 is a cross-sectional side view of illustrative filter and diffuser structures including an ink-based light filter layer that may be used in an electronic device of the type shown in FIG. 1 in accordance with an embodiment of the present invention.

FIG. 9 is a cross-sectional side view of opening 22 in a configuration that includes a filter formed from filtering ink and in which opening 22 has been covered with a diffuser. As shown in FIG. 9, filtering ink 42, which may forms a visible-light-blocking and IR-passing filter (e.g., IR ink), a filter that blocks IR light to compensate for the infrared-biased sensitivity S1 of sensor 56, or other suitable spectral filter, may be mounted over opening 22 so as to overlap slightly with the edges of opaque masking layer 30. Adhesive 44 may be used to attach diffuser 46 to filter 42. Adhesive 44 be a liquid adhesive (e.g., an adhesive material without a substrate) or may be implemented using two-sided adhesive tape such as optically clear adhesive (OCA) tape. Adhesive tape for forming adhesive layer 42 may include a thin polymer substrate. Adhesive material may be formed on both sides of the substrate. The polymer substrate may be formed from a sheet of clear plastic such as polypropylene, polyethylene, polyimide, polyethylene terephthalate (PET), polyester, or other flexible materials. The polymer substrate and/or the adhesive may be formed from translucent material (e.g., material that incorporates additives or bubbles that help scatter light). This allows the adhesive structures to serve as diffuser structures or to assist other diffuser structures in scattering light.

Figure 10:
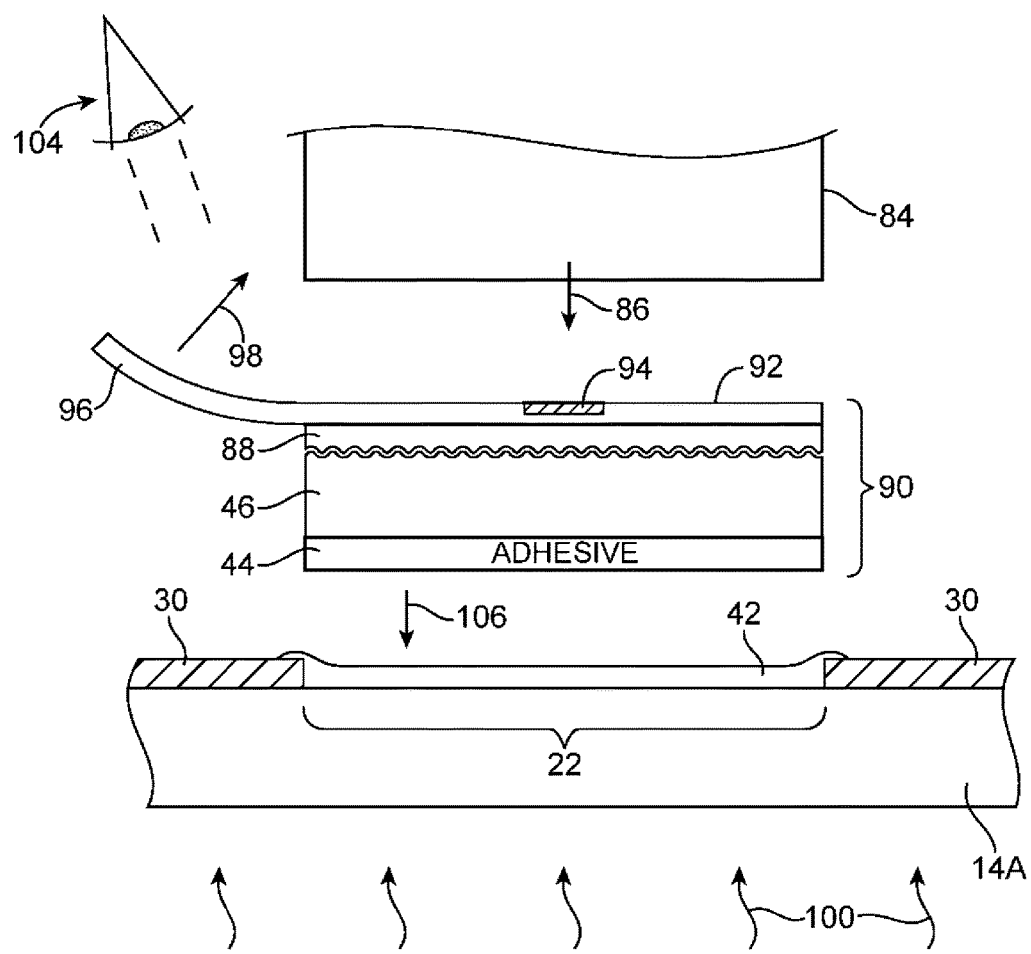
FIG. 10 is a diagram showing how a diffuser of the type shown in FIG. 9 may be attached to a planar transparent member such as a cover layer associated with a display in an electronic device in accordance with an embodiment of the present invention.
Figure 10:
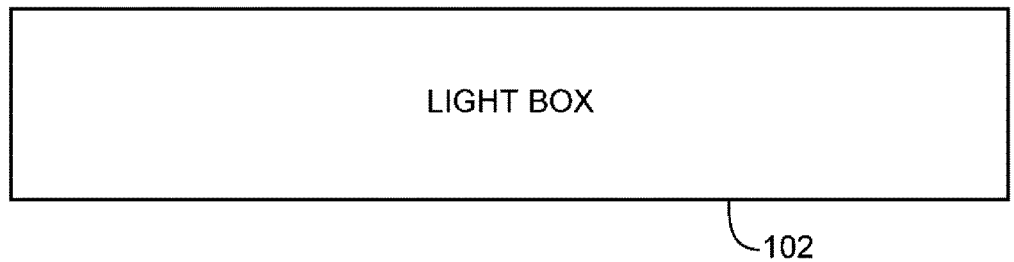

FIG. 10 shows how filter and diffuser structures of the type shown in FIG. 9 may be attached to opening 22. As shown in FIG. 10, a light box such as light box 102 may produce light 100. Light 100 may travel upwards through cover layer 14A. In the regions of cover layer 14A that are covered with opaque masking layer 30, light 100 is blocked from view by operator 104. In opening 22, however, at least some of light 100 may pass through infrared filter layer 42. Although filter layer 42 may be nominally opaque in the visible spectrum (e.g., in the illustrative arrangement in which filter layer 42 is formed from IR ink), sufficient visible light may pass through filter layer 42 to be viewed by user 104 of the system of FIG. 10.

Assembly 90 may include a layer of polymer film such as layer 92. Diffuser 46 may initially be attached to film 92 by releasable adhesive layer 88. Optically clear adhesive (OCA) tape 44 may be attached to the smooth surface of diffuser 46. While observing the location of opening 22 by viewing light 100 that has passed through opening 22, the user may push assembly 90 into opening 22 by pressing tool 84 downwards onto film 92 in direction 86. This presses adhesive 44 onto ink layer 42, as indicated by line 106. Tool 84 may be a flexible polymer rod or other suitable structure that is sufficiently soft to prevent scratches from forming in ink layer 42 when assembly 90 is pressed onto cover layer 14A. Once adhesive 44 has attached diffuser 46 to layer 42 in opening 22, tab 96 of film 92 may be peeled upwards in direction 98, releasing diffuser 46 from adhesive 88 and film 92.

To prevent situations in which film 92 is inadvertently left in place during manufacturing, film 92 may be provided with one or more visual indicators. Visual indicators for film 92 may take the form of patterns (e.g., a dot such as dot 94), distinguishable colors or other visually identifiable features. A visual indicator helps make it apparent whether or not film 92 is present on diffuser 46 and layer 14A.

Figure 11:
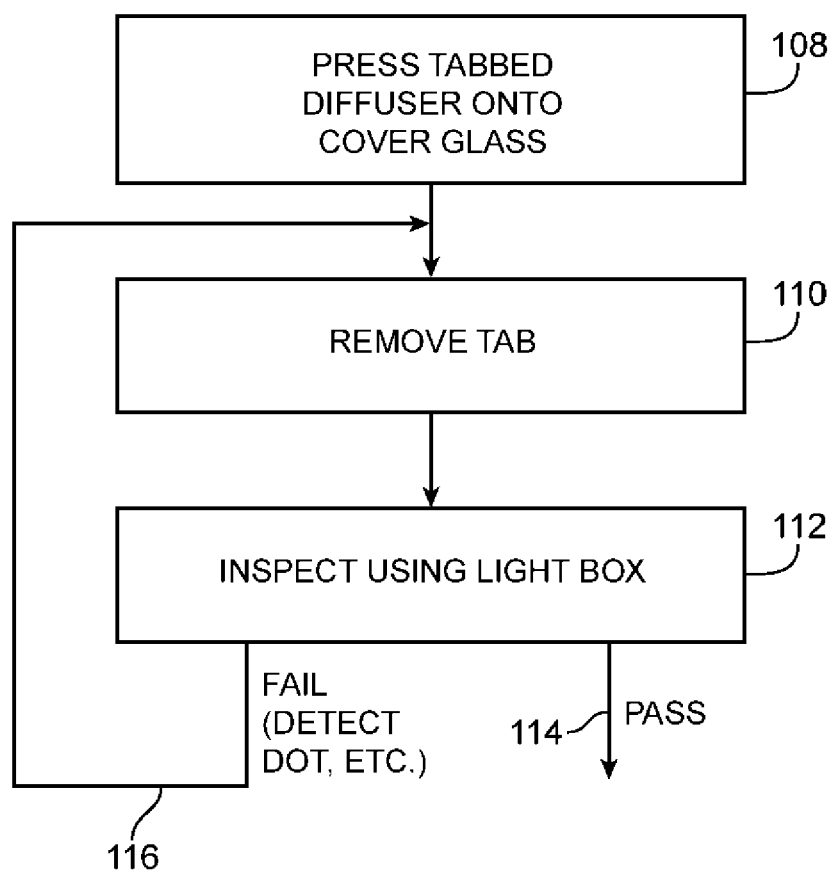
FIG. 11 is a flow chart of illustrative steps involved in assembling structures of the type shown in FIG. 10 into an electronic device during manufacturing operations in accordance with an embodiment of the present invention.

A flow chart of illustrative operations involved in attaching diffuser 46 to cover layer 14A using an arrangement of the type shown in FIG. 10 is shown in FIG. 11. At step 108, tool 84 may be used to press assembly 90 onto cover layer 14A. Once adhesive 44 has been pressed against cover layer 14A, tab 96 of flexible polymer layer 92 may be pulled upwards to remove layer 92 and adhesive 88 from diffuser 46 (step 110).

Following step 110, a user may inspect opening 22 to determine whether layer 92 is still present. If layer 92 has not been properly removed, a visual indicator such as indicator 94 of FIG. 10 will be visible. As indicated by line 116, the assembly process may then return to step 110 to remove layer 92 properly. If, however, visual inspection of hole 22 at step 112 reveals that layer 92 has been successfully removed, the technician performing the inspection can conclude that device 10 has passed inspection (line 114) and subsequent manufacturing operations may be performed.

If desired, filter structures and diffuser structures may be formed using solid filters (e.g., filters formed from solid pieces of plastic, glass, ceramic, etc.), integral filter and diffuser arrangements (e.g., filter-diffuser structures formed using solid pieces of plastic, glass, ceramic, etc.), filter-diffuser or diffuser structures that are molded into place on cover layer 14 (e.g., using liquid precursors that cure or using solid pieces of plastic or other material that can be thermally molded to cover layer 14), and/or lens-shaped structures (e.g., stand-alone lenses, integral lens-filter structures, integral lens-diffuser structures, integral lens-filter-diffuser structures, etc.). Arrangements such as these are shown in FIGS. 12, 13, 14, and 15.

Figure 12:
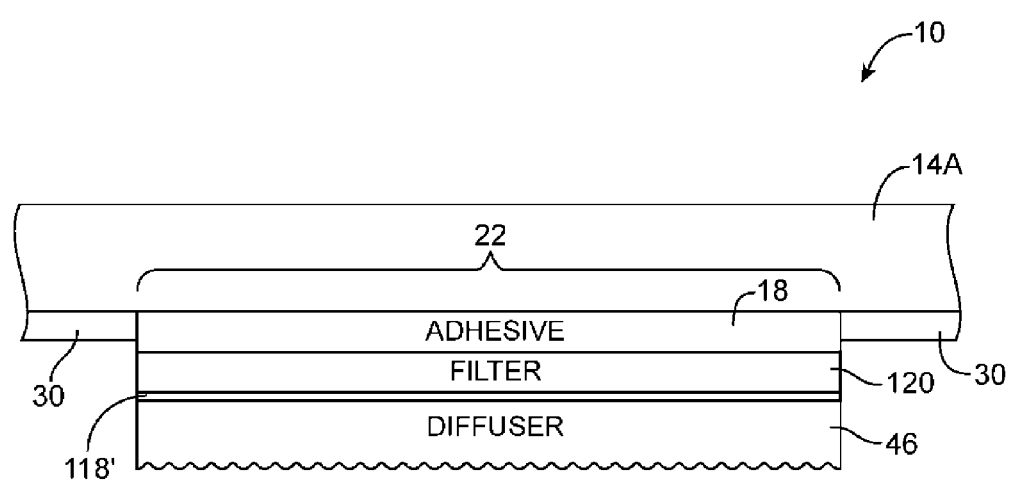
FIG. 12 is a cross-sectional side view of an illustrative filter and diffuser arrangement for a light sensor in an electronic device in which the filter is formed from a layer of material that is attached to a cover glass layer or other clear layer using adhesive in accordance with an embodiment of the present invention.

As shown in FIG. 12, filter 120 may be attached to cover layer 14A in opening 22 using adhesive 118. Diffuser 46 may be attached to filter 120 using adhesive 118'. If filter 120 is formed from a sticky material (e.g., optically clear adhesive with filter additives), adhesives such as adhesive 118 and/or adhesive 118' may be omitted. Filter 120 and diffuser 46 may be formed from solid materials such as solid polymers, glass, ceramic, or other suitable materials.

Figure 13:
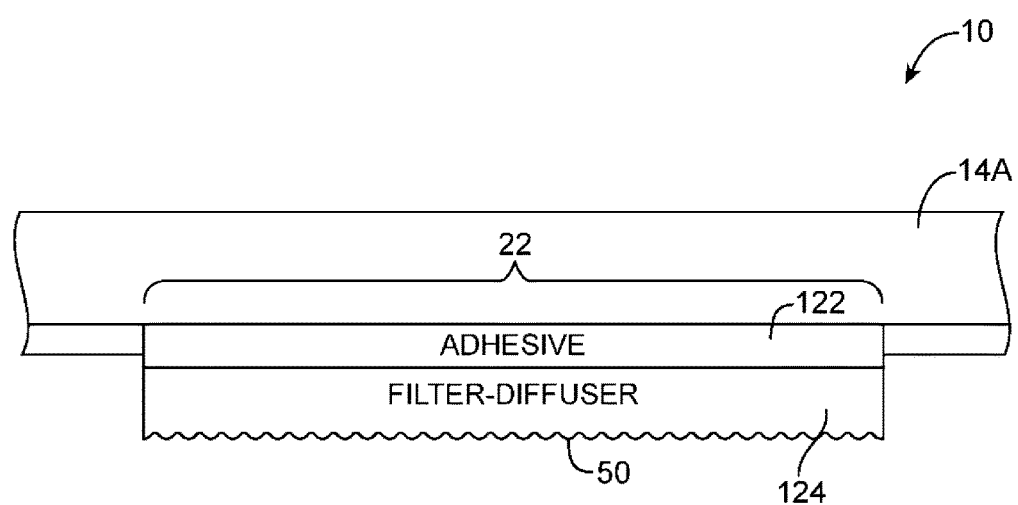
FIG. 13 is a cross-sectional side view of an illustrative integral filter and diffuser structure for a light sensor in an electronic device in accordance with an embodiment of the present invention.

FIG. 13 shows how filter structures and diffuser structures may be combined into a single unitary filter-diffuser structure (filter-diffuser 124). Filter-diffuser 124 may be formed from solid polymer, glass, ceramic, or other suitable materials. Filter-diffuser 124 may be attached to cover layer 14A using adhesive 122. Filter-diffuser may be provided with light filtering capabilities by incorporating dye into filter-diffuser 124. Light diffusing capabilities may be provided by forming a textured surface (e.g., surface 50) on the inner surface of filter-diffuser.

Figure 14:
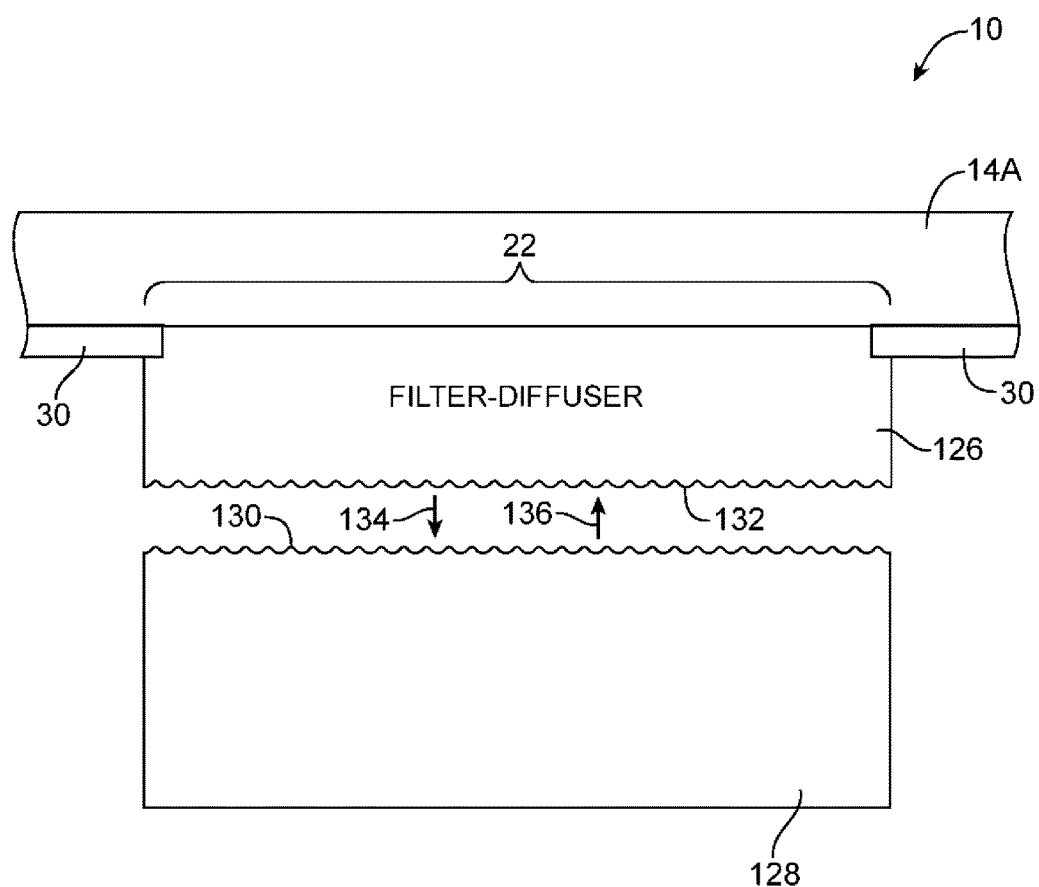
FIG. 14 is a diagram showing how a tool with a roughened surface may be used in forming a diffuser structure such as a diffuser built into an integral filter and diffuser in accordance with an embodiment of the present invention.

FIG. 14 shows how an integral filter-diffuser may be formed from a liquid or moldable polymer or other structure that can be molded into place on cover layer 14A. As shown in FIG. 14, material for filter-diffuser (e.g., a polymer with filter dye) may be pressed against cover layer 14A in opening 22 using tool 128. Tool 128 may first press inward in direction 136. After filter-diffuser 126 has solidified (e.g., by cooling, by chemically curing, by curing through application of ultraviolet light, etc.), tool 128 may be removed in direction 134. Tool 128 may be formed from a polymer, metal, glass, ceramic, or other material with a textured surface (textured surface 130). When removed from filter-diffuser 126 in direction 134, the texture from surface 130 may be mirrored in the texture of surface 132. Filter-diffuser 126 of FIG. 14 may also be provided with diffusing properties by including voids or other light-scattering structures within filter-diffuser 126.

Figure 15:
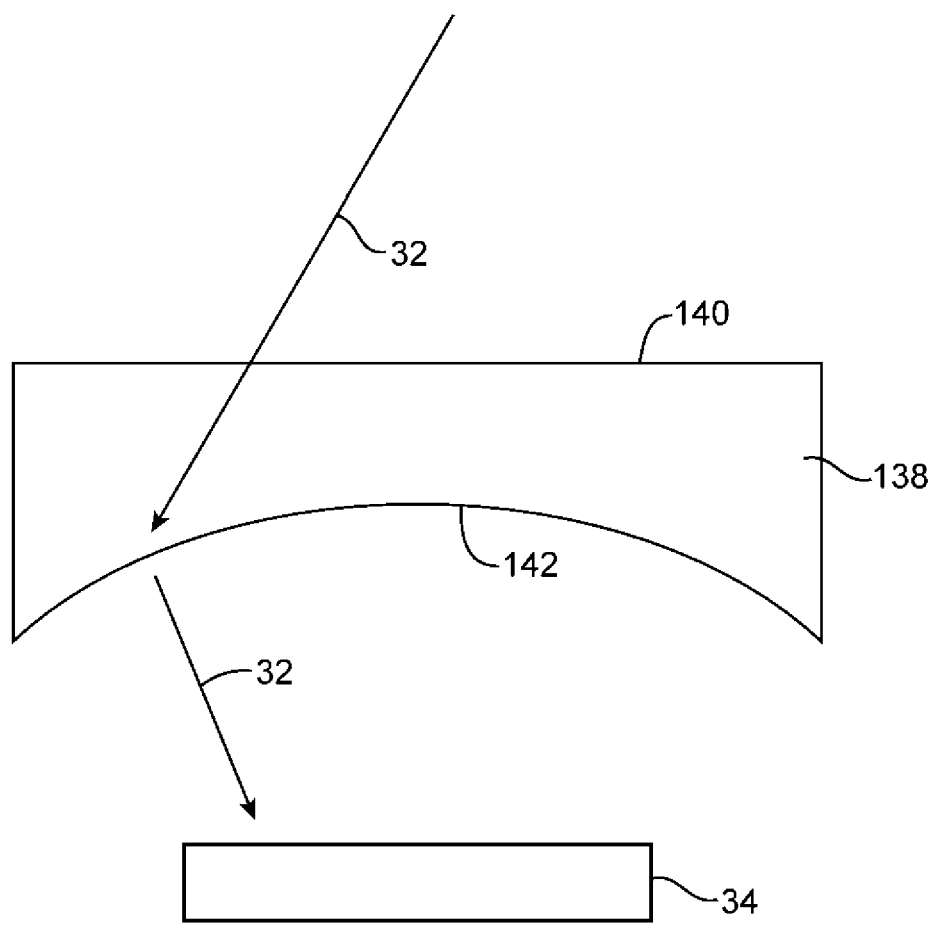
FIG. 15 is a diagram of an illustrative optical structure such as a filter, diffuser, filter-diffuser, or stand-alone optical element that has been configured to form a light concentrating lens structure for a light sensor in accordance with an embodiment of the present invention.

If desired, filter and diffuser structures and stand-alone optical elements associated with opening 22 and sensor 34 may be provided with lens shapes to help concentrate incoming light onto the active portion of sensor 34. An illustrative optical structure with a lens shape of this type is shown in FIG. 15. As shown in FIG. 15, optical structure 138 may be provided with a planar upper surface such as surface 140 and a concave lower surface 142 (as an example). The concave shape of lower surface 142 may help focus light onto sensor 34, as indicated by the trajectory of illustrative light ray 32 of FIG. 15. The lens shape of optical structure 138 of FIG. 15 may be used for a sensor filter (e.g., a visible-light-blocking and infrared-light passing filter), for a light diffuser, for an integral filter-diffuser, or for a stand-alone optical element that is stacked in series with other optical elements in opening 22.

When used as a diffuser or integral filter-diffuser, diffusing properties can be provided by incorporating voids or other light-scattering structures within structure 138 or may be provided by including a texture on one or both surfaces of structure 138. To preserve the focusing capabilities of structure 138 when a textured surface is used, it may be desirable to form the texture on upper planar surface 140. This may help avoid situations in which light is scattered from lower surface 142 instead of being focused. When the textured surface is located on the upper surface of structure 138, any adhesive that is used in attaching the textured surface to cover layer 14A may be restricted to the periphery of structure 138 (if desired) to help ensure that the presence of the adhesive does not interfere with the light-scattering properties of the textured surface. Structures of the type shown in FIG. 15 may be attached to cover layer 14A using one or more layers of adhesive.

To avoid saturating sensor 56, a layer such as layer 42 of FIG. 3 may be provided that reduces the intensity of incoming light without completely blocking all incoming light present in opening 22. Visible light intensity may, for example, be reduced in intensity so that only 2% of incoming light in opening 22 passes through layer 42 to sensor 56. Sensor filter 35, IR-absorbing material in layer 42, or other filter structures may similarly be used to reduce infrared light intensity.

If desired, the intensity of the light that is received by sensor 56 can be controlled by adjusting the size of opening 22. For example, the size of opening 22 may be limited to a relatively small size (e.g., to a diameter of less than 1 mm, less than 0.5 mm, less than 0.2 mm, less than 0.1 mm, etc.). Light intensity may also be controlled by forming opening 22 from multiple smaller openings rather than one larger opening.

Figure 16:
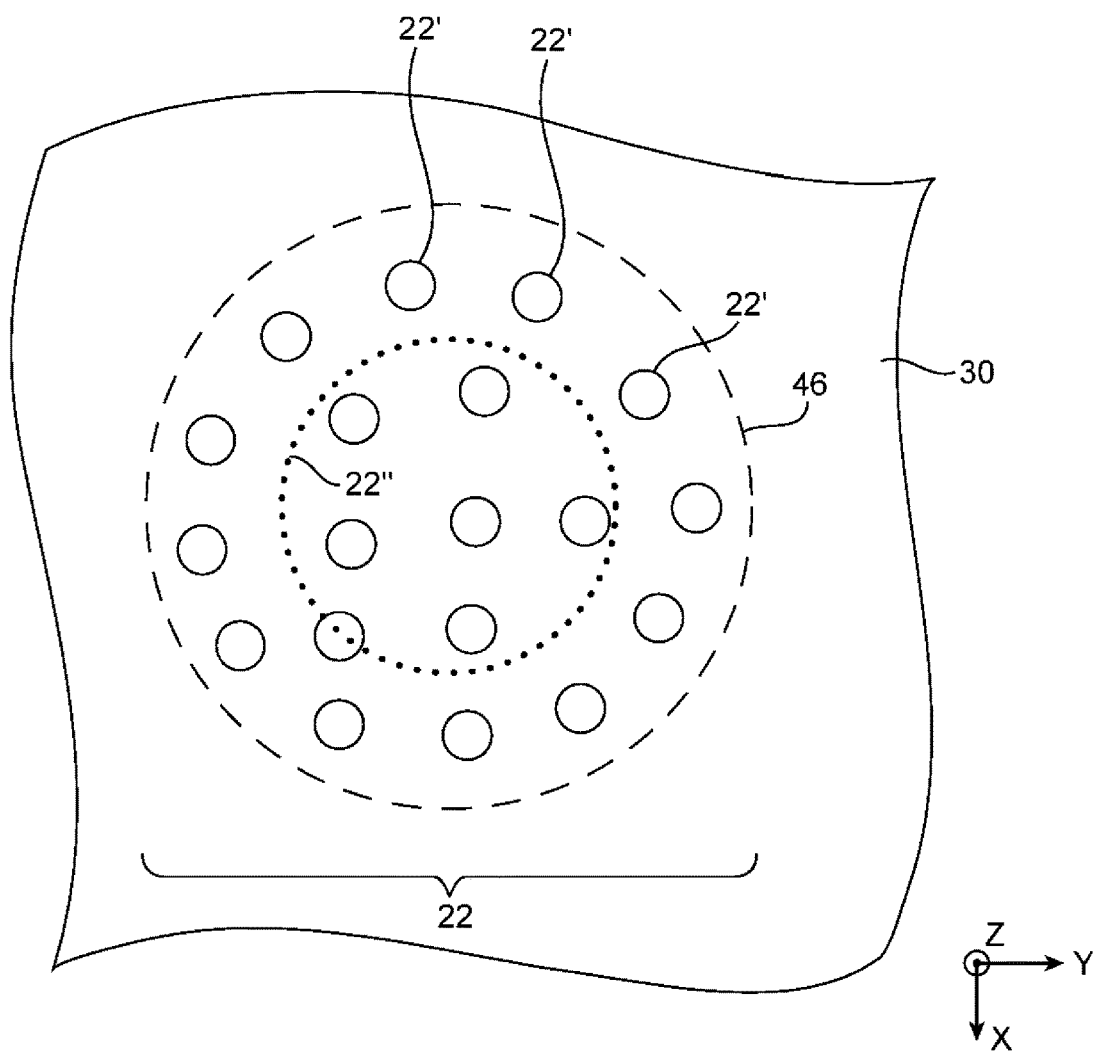
FIG. 16 is a diagram of a window in an opaque masking layer that has been formed using multiple perforations in accordance with an embodiment of the present invention.

Light intensity control structures that have been implemented by incorporating patterned opening features such as these into opaque masking layer 30 are shown in FIG. 16. FIG. 16 is view of opening 22 along the Z-axis of FIG. 3. As shown in FIG. 16, window 22 may be implemented by grouping multiple smaller openings 22' together. In the example of FIG. 16, there are numerous smaller openings 22' (e.g., perforations) in layer 30 that are organized in a circular cluster to form a circular-shaped window for device 10. As shown by the dashed line in FIG. 16, diffuser 46 may be aligned so as to overlap openings 22'. There may be two or more openings 22'. Because openings 22' in the example of FIG. 16 are collectively smaller than the single large opening 22 of FIG. 3, less light will pass through the multi-perforation opening 22 of FIG. 16 than opening 22 of FIG. 3. By selection of an appropriate number of openings 22', the amount of light that passes to sensor 56 may be adjusted to avoid sensor saturation. Light intensity may also be controlled by reducing the size of opening 22 of FIG. 3 (e.g., to form a single smaller-diameter opening such as opening 22" of FIG. 16).

Light-intensity control schemes that are based on controlling the aperture of opening 22 (as with illustrative opening 22" of FIG. 16) or that are based on using multiple openings 22' to form window opening 22 (as with illustrative openings 22' of FIG. 16) may be used with or without the use of filter structures such as structure 42 of FIG. 3.

The foregoing is merely illustrative of the principles of this invention and various modifications can be made by those skilled in the art without departing from the scope and spirit of the invention.

What is claimed is:

1. Apparatus, comprising:
  a transparent planar member having a central region that emits light and a peripheral region that surrounds the central region;
  an opaque masking layer on the transparent planar member in the peripheral region;
  a light diffuser attached to the transparent planar member in alignment with at least one opening in the opaque masking layer in the peripheral region;
  a light sensor aligned with the opening in the opaque masking layer, wherein the light diffuser is interposed between the transparent planar member and the light sensor and is configured to diffuse light that passes through the opening, and wherein the light sensor receives the diffused light; and
  a layer of filtering ink in the opening, wherein the filtering ink is interposed between the transparent planar member and the light diffuser and wherein the filtering ink is configured to pass at least some light to the light sensor.

2. The apparatus defined in claim 1 wherein the layer of filtering ink is configured to block at least some visible light and wherein the light received through the opening by the light sensor comprises visible light.

3. The apparatus defined in claim 1 further comprising a display, wherein the transparent planar member comprises a cover layer for the display.

4. The apparatus defined in claim 3 wherein the cover layer comprises a layer of glass.

5. The apparatus defined in claim 4 wherein the light diffuser comprises a transparent structure with at least one textured surface.

6. The apparatus defined in claim 1 wherein the light diffuser comprises a concave surface.

7. The apparatus defined in claim 6 wherein the light diffuser is part of an integral filter-diffuser structure with a non-flat spectral transmittance characteristic.

8. The apparatus defined in claim 1 wherein the opening comprises one of a plurality of perforations that are clustered to form a window in the opaque masking layer through which light passes to the light sensor.

9. An electronic device, comprising:
  a housing;
  a display mounted in the housing, wherein the display has a rectangular active area and a peripheral inactive area, wherein the display has a transparent cover layer, wherein a portion of the transparent cover layer is coated with an opaque masking layer having a hole, and wherein the opaque masking layer is coated on an inner surface of the transparent cover layer in the peripheral inactive area;
  a layer of visible-light-blocking ink coated on the inner surface of the transparent cover layer in the hole;
  a light diffuser mounted within the electronic device;
  a light sensor, wherein the light diffuser is interposed between the layer of visible-light-blocking ink in the hole and the light sensor, and wherein the light diffuser reduces a directionality of the light; and
  an infrared-light-blocking filter interposed between the light sensor and the light diffuser, wherein the light sensor receives light through the layer of visible light-blocking ink in the hole, the light diffuser, and the infrared-light-blocking filter.

10. The electronic device defined in claim 9 wherein the light diffuser comprises a textured surface.

11. The electronic device defined in claim 9 further comprising adhesive that attaches the light diffuser to the layer of visible-light-blocking ink.

12. The electronic device defined in claim 11 wherein the light-diffuser has a planar untextured surface that is attached to the layer of visible-light-blocking ink with the adhesive and wherein the textured surface of the light diffuser faces the light sensor.

13. Apparatus, comprising:
  a display with a cover layer, wherein the display includes an active area and an inactive area;
  an opaque masking layer on peripheral portions of the cover layer;

a light sensor that is mounted under the inactive area on a printed circuit board and that receives light through an opening in the opaque masking layer;

a light diffuser interposed between the opening and the light sensor through which the light sensor receives the light;

light-blocking structures mounted on the printed circuit board that surround the light sensor, wherein the light blocking structures comprise an opening in which the light sensor is mounted and through which the light sensor receives the light;

a first filter layer interposed between the cover layer and the light sensor, wherein the first filter layer blocks infrared light;

a second filter layer interposed between the diffuser and the light sensor, wherein the second filter layer blocks infrared light; and a third filter layer interposed between the second filter layer and the light sensor, wherein the third filter layer blocks visible light, and wherein the light sensor receives light through the first, second, and third filter layers.

14. The apparatus defined in claim 13 wherein the light diffuser has a concave surface that faces the light sensor.

15. The apparatus defined in claim 13, wherein the light diffuser receives the light and redirects the light onto the light sensor.

\* \* \* \* \*